United States Patent [19]

Hong et al.

[11] Patent Number: 5,668,715

[45] Date of Patent: Sep. 16, 1997

[54] MULTIPLE OUTPUT, ZERO VOLTAGE SWITCHING, SERIES RESONANT VHF INVERTER

[75] Inventors: Wilbur E. Hong; David M. Lusher, both of Torrance; William B. Hwang, Los Angeles, all of Calif.

[73] Assignee: Hughes Electronics, Los Angeles, Calif.

[21] Appl. No.: 671,035

[22] Filed: Jun. 27, 1996

[51] Int. Cl.$^6$ .................... H02M 7/537; H04B 1/18
[52] U.S. Cl. ..................... 363/131; 455/182.1
[58] Field of Search .................. 363/131, 132; 455/180.1, 180.2, 182.1

[56] References Cited

U.S. PATENT DOCUMENTS

| | | | |
|---|---|---|---|
| 3,878,481 | 4/1975 | Healey, III | 331/105 |
| 4,596,044 | 6/1986 | Aoki et al. | 455/189.1 |
| 4,710,973 | 12/1987 | Suzuki | 455/180.4 |
| 5,162,963 | 11/1992 | Washburn et al. | 361/18 |
| 5,410,276 | 4/1995 | Hwang et al. | 330/297 |

Primary Examiner—Matthew V. Nguyen
Attorney, Agent, or Firm—Leonard A. Alkov; Wanda Denson-Low

[57] ABSTRACT

VHF DC to AC inverters which include switching circuitry (13, 115, 125) and multiple resonant waveshaping networks (C11, L11, C12; C21, L21, C22; C111, L111; C221, L221; C331, L331; C441, L441) connected between the switching circuitry and respective load circuits (33, 43, 133, 143).

10 Claims, 1 Drawing Sheet

MULTIPLE OUTPUT, ZERO VOLTAGE SWITCHING, SERIES RESONANT VHF INVERTER

BACKGROUND OF THE INVENTION

The disclosed invention is directed generally to DC to AC inverters, and more particularly to a VHF DC to AC inverter that provides multiple outputs.

DC to AC inverters are commonly employed in applications which require the conversion of DC power to AC power, including for example power supplies. DC to AC inverters have been designed to operate in the VHF range of frequencies since higher frequencies allow for significantly smaller passive components and also provide for faster feedback response to load perturbations.

In many applications multiple power supply outputs are required, for example a main output and one or more auxiliary output. Typically, this is accomplished by the use of separate inverters, or power splitters for dividing the output of a single inverter.

Considerations with separate inverters and power splitters include complexity, reduced efficiency, and increased parts count. A further consideration with power splitters is the effect of regulation of one power splitter port on another power splitter port.

SUMMARY OF THE INVENTION

It would therefore be an advantage to provide a VHF DC to AC inverter that provides multiple outputs.

The foregoing and other advantages are provided by the invention in a VHF DC to AC inverter that includes a switch connected between a supply voltage and reference voltage; a first resonant waveshaping network responsive to the switch; a first load circuit responsive to the first resonant waveshaping network; a second resonant waveshaping network responsive to switch; and a second load circuit responsive to the second resonant waveshaping network.

A further VHF DC to AC inverter in accordance with the invention includes a first resonant waveshaping network comprised of a first capacitor and a first inductor connected in series between a first supply voltage node and a first central node, the first supply voltage node being at a positive voltage relative to ground; a second resonant waveshaping network comprised of a second capacitor and a second inductor connected in series between the first supply voltage node and a second central node; a first switch connected across the first capacitor and the second capacitor, the first switching means being driven with a first periodic drive signal of a predetermined frequency; a third resonant waveshaping network comprised of a third capacitor and a third inductor connected in series between a second supply voltage node and the first central node, the second supply voltage node being at a voltage that is less than the positive voltage; a fourth resonant waveshaping network comprised of a fourth capacitor and a fourth inductor connected in series between the second supply voltage node and the second central node, the second supply voltage node being at a voltage that is less than the positive voltage; and a second switch connected across the third and fourth capacitors, the second switching means being driven with a second periodic signal of the predetermined frequency and being out of phase by 180 degrees relative to the first periodic drive signal. A first bandpass filter responsive to the first resonant waveshaping network and the third resonant waveshaping network provides power to a first load circuit, while a second bandpass filter responsive to the second resonant waveshaping network and the fourth resonant waveshaping network provides power to a second load circuit.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
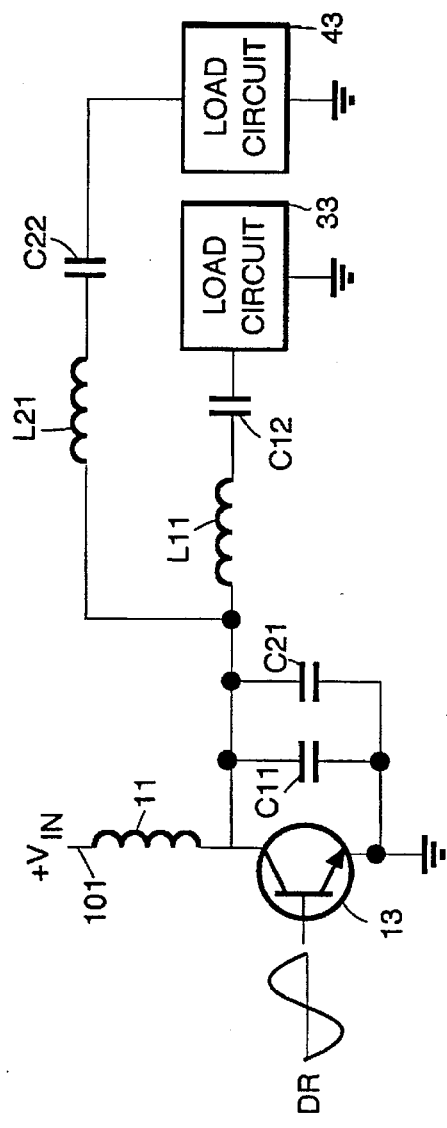
FIG. 1 is a schematic circuit diagram of a multiple output class E VHF DC to AC inverter in accordance with the invention.

In the following detailed description and in the several figures of the drawing, like elements are identified with like reference numerals.

Referring now to FIG. 1, set forth therein is a schematic diagram of a VHF DC to DC inverter in accordance with the invention which includes an RF choke 11 having one terminal connected to a supply node 101 which is connected to a supply voltage $V_{IN}$ that is positive relative to a ground reference. The other terminal of the RF choke 11 is connected to the collector terminal of an NPN transistor 13. The emitter terminal of the NPN transistor 13 is connected to a ground reference potential, while the base of the NPN transistor 13 is driven with a periodic drive voltage signal DR which has a predetermined frequency $F_0$. By way of illustrative example, the periodic drive voltage signal DR comprises a sinusoid.

A capacitor C11 is connected between the collector of the NPN transistor 13 and the ground, and an inductor L11 is connected between the collector of the NPN transistor 13 and one terminal of a capacitor C12. The other terminal of the capacitor C12 is connected to a load circuit 33 which can be a regulated load.

The VHF DC to DC inverter of FIG. 1 further includes a capacitor C21 that is connected between the collector of the NPN transistor 13 and the ground, and an inductor L21 that is connected between the collector of the NPN transistor 13 and one terminal of a capacitor C22. The other terminal of the capacitor C22 is connected to a load circuit 43 which can be a regulated load.

The capacitor C11, the inductor L11, and the capacitor C12 form a first resonant waveshaping network, while the capacitor C21, the inductor L21, and the capacitor C22 form a second resonant waveshaping network. These networks are tuned to substantially the same frequency, for example in the range of about 0.8 $F_0$ to about 0.9 $F_0$, where $F_0$ is the frequency of the periodic drive signal DR, but are configured to deliver different amounts of power. Thus, the ratios of the values of corresponding elements in the first and second resonant waveshaping networks are determined by the ratio of the power provided to the load circuits 33, 43. In particular, where the ratio of the power delivered to the first load circuit and the power delivered to the second load circuit is A/B, the ratio between the value of the capacitor C11 of the first waveshaping network and the value of the capacitor C21 of the second waveshaping network is A/B (i.e., the value of C21 is B/A times the value of C11).

Correspondingly, the ratio between the value of the inductor L11 of the first waveshaping network and the value of the inductor L21 of the second waveshaping network is B/A (i.e., the value of L21 is A/B times the value of L11). The ratio between the value of the capacitor C12 of the first waveshaping network and the value of the capacitor C22 of the second resonant waveshaping network is A/B (i.e., the value of C22 is B/A times the value of C12).

The switch 13 (which can alternatively be implemented as a power FET), the capacitor C11, the inductor L11, and the capacitor C12, together with the RF choke 11 comprise a conventional class E VHF DC-AC inverter, configured to deliver a power A to the load circuit 33. The capacitor C11, the inductor L11, and the capacitor C12 comprise a resonant waveshaping network that ensures that the voltage Vce across the switch 13 is zero when the switch 13 is turned on, and that the voltage Vce across the switch 13 will rise slowly (from Vce=Vsat≈0) when the switch is turned off, thus allowing switch current to drop to zero before appreciable switch voltage has built up.

The capacitor C21, the inductor L21, and the capacitor C22 also comprise a resonant waveshaping network that functions similarly to the resonant network comprised of the capacitor C11, the inductor L11, and the capacitor C12, and together with the switch 13 and the RF choke 11 comprise a conventional class E VHF DC-AC inverter, configured to deliver a power B to the load circuit 43.

When the two inverter circuits in the inverter of FIG. 1 are operated together, elements in parallel can be combined. Thus, the switch 13 and the RF choke 11 perform functions for both resonant circuits, and the capacitor C11 can be combined with the capacitor C21. Effectively, two inverters are realized with one switch 13, one RF choke 11, and one collector-emitter capacitor (or drain-source capacitor if the switch 13 is implemented with an FET). Thus, a separate AC output is provided by only one additional inductor and one additional capacitor. In contrast, the power splitter approach referred to in the background discussion would require two additional inductors, two additional capacitors, and an additional resistor.

Figure 2:
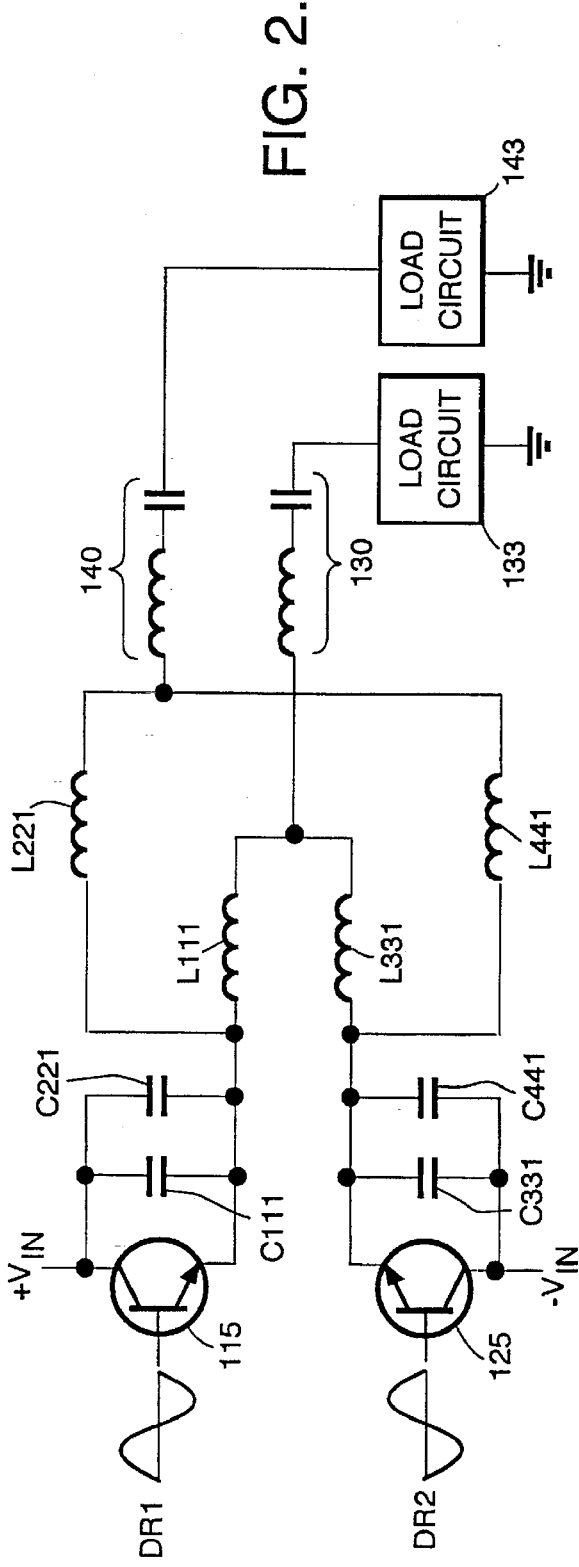
FIG. 2 is a schematic diagram of a multiple output series resonant half bridge VHF DC to AC inverter in accordance with the invention.

Referring now to FIG. 2, set forth therein is a schematic diagram of a series resonant half bridge VHF DC to AC inverter in accordance with the invention which includes a capacitor C111 having one terminal connected to a first supply node 201 which is connected to a supply voltage $V_{IN}$ that is positive relative to a ground reference. The other terminal of the capacitor C111 is connected to one terminal of an inductor L111 which has its other terminal connected to a first central node 103. The collector terminal of a first NPN transistor 115 is connected to the first supply node 201, while the emitter of the first NPN transistor 115 is connected to the node between the capacitor C111 and the inductor L111. The base of the first NPN transistor 115 is driven with a first periodic drive voltage signal DR1 which has a predetermined frequency.

A capacitor C221 has one terminal connected to the first supply node 201 which is connected to the supply voltage $V_{IN}$ that is positive relative to a ground reference. The other terminal of the capacitor C221 is connected to one terminal of an inductor L221 which has its other terminal connected to second central node 203.

The first NPN transistor 115 comprises an active switch that provides an open circuit when it is open or non-conductive, and electrically connects the terminals of the capacitors C111, C221 when it is conductive. The capacitor C111 and the inductor L111 comprise a first resonant waveshaping network, while the capacitor C221 and the inductor L221 comprise a second resonant waveshaping network.

The DC to AC inverter of FIG. 2 further comprises a capacitor C331 having one terminal connected to a second supply node 202 which is connected to a second supply voltage $-V_{IN}$ that is negative with respect to the first supply voltage $V_{IN}$. The other terminal of the capacitor C331 is connected to one terminal of an inductor L331 which has its other terminal connected to the first central node 103. The collector terminal of a second NPN transistor 125 is connected to the node between the capacitor C331 and the inductor L331, while the emitter of the second NPN transistor 125 is connected to the second supply node 202. The base of the second NPN transistor 125 is driven with a second periodic drive voltage signal DR2 which is of the same predetermined frequency as the first periodic drive voltage signal DR1, but is 180 degrees out of phase with respect to the first periodic drive voltage signal DR1.

A capacitor C441 has one terminal connected to the second supply node 202 which is connected to the second supply voltage $-V_{IN}$ that is negative with respect to the first supply voltage $V_{IN}$. The other terminal of the capacitor C661 is connected to one terminal of an inductor L441 which has its other terminal connected to the second central node 103.

The second NPN transistor 125 comprises an active switch that provides an open circuit when it is open or non-conductive, and electrically connects the two terminals of the capacitors C331, C441 when it is conductive. The capacitor C331 and the inductor L331 comprise a third resonant waveshaping network, while the capacitor C441 and the inductor L441 comprise a fourth resonant waveshaping network.

A first LC bandpass filter 130 connected to the first central node 103 is responsive to the first and third resonant waveshaping networks formed of the capacitors C111, C331 and the inductors L111, L331, and provides power to a first load circuit 133 which can be a regulated load. A second LC bandpass filter 140 connected to the second central node 103 is responsive to the second and fourth resonant waveshaping networks formed of the capacitors C221, C441 and the inductors L221, L441, and provides power to a second load circuit 143 which can be a regulated load.

The first resonant network formed by elements C111, L111 and the third resonant network formed by the elements C331, L331 are substantially identical. Similarly, the second resonant network formed by elements C221, L221 and the fourth resonant network formed by the elements C441, L441 are substantially identical. These networks are tuned to substantially the same frequency, but are configured to deliver different amounts of power. Thus, the ratios of the values of corresponding elements in the first resonant waveshaping network (C111, L111) and the second resonant waveshaping network (C221, L221) are determined by the ratio of the power provided to the load circuits 133, 143. Similarly, the ratios of the values of corresponding elements in the third resonant waveshaping network (C331, L331) and the fourth resonant waveshaping network (C331, L441) are determined by the ratio of the power provided to the load circuits 133, 143. In particular, where the ratio of the power delivered to the first load circuit 133 and the power delivered to the second load circuit 143 is A/B, the ratio between the value of the capacitor C111 of the first waveshaping network and the value of the capacitor C221 of the second waveshaping network is A/B (i.e., the value of C221 is B/A times the value of C111). Correspondingly, the ratio between the value of the inductor L111 of the first waveshaping network and the value of the inductor L221 of the second waveshaping network is B/A (i.e., the value of L221 is A/B times the value of L111). The ratio between the value of the capacitor C331 of the third waveshaping network and the value of the capacitor C441 of the fourth waveshaping network is A/B (i.e., the value of C441 is B/A times the value of C331). Correspondingly, the ratio between the value of the inductor L331 of the third waveshaping network and the value of the inductor L441 of the fourth waveshaping network is B/A (i.e., the value of L441 is A/B times the value of L331).

Insofar as the first resonant network (C111, L111) and the third resonant network (C331, L331) are substantially identical, the capacitance of C111 is substantially equal to the capacitance of C331, and the inductance of L111 is substantially equal to the inductance of L331. Similarly, the second resonant network (C221, L221) and the fourth resonant network (C441, L441) are substantially identical, and the capacitance of C221 is substantially equal to the capacitance of C441, while the inductance of L221 is substantially equal to the inductance of L441.

More particularly as to the drive signals DR1, DR2, the inductors L111, L221, L331, L441 prevent rapid buildup of current, which allows the transistors 115, 125 to be advantageously driven with a 50 percent duty cycle. Thus, the first and second periodic drive voltage signals DR1, DR2 can comprise sinusoids which are easily produced in the VHF range. By way of illustrative example, the frequency of the periodic drive voltage signals DR1, DR2 is in the range of 30 MHz to 200 MHz. Since the transistors 115, 125 can be driven with a 50 percent duty, the resonant waveshaping networks can be tuned for example to a resonant frequency that is in the range of 0.75 $F_0$ to 1.1 $F_0$, wherein $F_0$ is the frequency of the periodic drive voltage signals DR1, DR2 and thus the operating frequency of the inverter of FIG. 2.

The switches 115, 125, the capacitors C111, C331, the inductors L111, L331, and the bandpass filter 130 more particularly comprise a series-resonant half-bridge VHF DCAC inverter configured to supply a power A to the load circuit 133. The capacitor C111 and the inductor L111 comprise a resonant network which ensures that the voltage Vce across the switch 115 is zero when the switch 115 is turned on, and that the voltage Vce across the switch 115 will rise slowly from zero when the switch 115 is turned off, thus allowing the switch current to drop to zero before appreciable switch voltage has built up. The capacitor C331 and the inductor L331 perform a similar function for the switch 125.

In operation, since the drive signals DR1, DR2 are 180 degrees out of phase, the switch 115 is on when the switch 125 is off, and the switch 125 is on when the switch 115 is off.

When the switch 115 is on, current is delivered from the node 201 (which is connected to $V_{IN}$) through the inductor L111 into the node 103. Some of the current is delivered into the bandpass filter 130 (where harmonic content is filtered) and hence into the load circuit 133. The rest of the current provides energy for the resonant circuit comprised of the capacitor C331 and the inductor L331. Similarly, when the switch 125 is on, current is returned from the load circuit 133 through the bandpass filter 130 into the node 103. Some the current returns through the inductor L331 into the node 202 which is connected to $-V_{IN}$. The rest of the current provides energy for the resonant circuit formed by the capacitor C111 and the inductor L111.

The switches 115, 125, the capacitors C221, C441, the inductors L221, L441, and the bandpass filter 140 comprise a series-resonant half-bridge VHF DC-AC inverter configured to supply a power B to the load circuit 143. This inverter behaves in substantially the same manner as the inverter comprised of the switches 115, 125, the capacitors C111, C331, the inductors L111, L331, and the bandpass filter 130, described above. Thus, the capacitor C221 performs the same function as the capacitor C111, and the inductor L221 performs the same function as the inductor L111. The capacitor C441 performs the same function as the capacitor C331, and the inductor L441 performs the same function as the inductor L331. The bandpass filter 140 performs the same function as the bandpass filter 130.

When the two inverter circuits of the inverter of FIG. 2 are operated together, elements in parallel can be combined. Thus, the switches 115, 125 can perform the switching function for both inverters, the parallel capacitors C111, C221 can be combined, and the parallel capacitors C3331, C441 can be combined. Thus, two inverters are realized using only one pair of switches and one pair of collector-emitter capacitors.

The foregoing has thus been a disclosure of VHF DC to AC inverters that efficiently provide for multiple outputs with reduced complexity.

Although the foregoing has been a description and illustration of specific embodiments of the invention, various modifications and changes thereto can be made by persons skilled in the art without departing from the scope and spirit of the invention as defined by the following claims.

What is claimed is:

1. A VHF DC to AC inverter comprising:
   switching means connected between a supply voltage and a reference voltage, wherein said switching means includes a transistor having a first terminal and a second terminal, and an inductor connected between said first terminal and the supply voltage;
   a first resonant waveshaping network responsive to said switching means, wherein said first resonant circuit includes a first resonant circuit first capacitor connected between said first terminal and said second terminal, and a first resonant circuit inductor and a first resonant circuit second capacitor connected to said first terminal;
   a first load circuit responsive to said resonant waveshaping network;
   a second resonant waveshaping network responsive to said switching means, wherein said second resonant circuit includes a second resonant circuit first capacitor connected between said first terminal and said second terminal, and a second resonant circuit inductor and a second resonant circuit second capacitor connected to said first terminal; and
   a second load circuit responsive to said second resonant waveshaping network.

2. The DC to AC inverter of claim 1 wherein the values of said first resonant circuit first capacitor, inductor, and second capacitor are respectively proportional relative to the values of said second resonant circuit first capacitor, inductor, and second capacitor in accordance with a ratio of power delivered to said first load circuit and power delivered to said second load circuit.

3. The DC to AC inverter of claim 2 wherein:
   the ratio of power delivered to said first load circuit and power delivered to said second load circuit is A/B;
   the ratio between the value of said first resonant circuit first capacitor and the value of said second resonant circuit first capacitor is A/B;

the ratio between the value of said first resonant circuit inductor and the value of said second resonant circuit inductor is B/A; and the ratio between the value of said first resonant circuit second capacitor and the value of said second resonant circuit second capacitor is A/B.

4. A DC to AC inverter comprising:

a first resonant waveshaping network comprised of a first capacitor and a first inductor connected in series between a first supply voltage node and a first central node, said first supply voltage node being at a positive voltage relative to ground;

a second resonant waveshaping network comprised of a second capacitor and a second inductor connected in series between the first supply voltage node and a second central node;

first switching means connected across said first capacitor and said second capacitor, said first switching means being driven with a first periodic drive signal of a predetermined frequency;

a third resonant waveshaping network comprised of a third capacitor and a third inductor connected in series between a second supply voltage node and the first central node, said second supply voltage node being at a voltage that is less than said positive voltage;

a fourth resonant waveshaping network comprised of a fourth capacitor and a fourth inductor connected in series between the second supply voltage node and the second central node, said second supply voltage node being at a voltage that is less than said positive voltage;

second switching means connected across said third and fourth capacitors, said second switching means being driven with a second periodic signal of said predetermined frequency and being out of phase by 180 degrees relative to said first periodic drive signal;

a first bandpass filter connected to said first central node and responsive to said first resonant waveshaping network and said third resonant waveshaping network;

a first load circuit responsive to said first bandpass circuit;

a second bandpass filter connected to said second central node and responsive to said second resonant waveshaping network and said fourth resonant waveshaping network; and a second load circuit responsive to said second bandpass filter.

5. The DC to AC inverter of claim 4 wherein said first resonant waveshaping network and said third resonant waveshaping network are substantially identical.

6. The DC to AC inverter of claim 5 wherein the values of said first resonant network capacitor and inductor are respectively proportional relative to the values of said second resonant circuit capacitor and inductor in accordance with a ratio of power delivered to said first load circuit and power delivered to said second load circuit, and wherein the values of said third resonant network capacitor and inductor are respectively proportional relative to the values of said fourth resonant circuit capacitor and inductor in accordance with the ratio of power delivered to said first load circuit and power delivered to said second load circuit.

7. The DC to AC inverter of claim 6 wherein:

the ratio of power delivered to said first load circuit and power delivered to said second load circuit is A/B;

the ratio between the value of said first resonant network capacitor and the value of said second resonant network capacitor is A/B;

the ratio between the value of said first resonant network inductor and the value of said second resonant network inductor is B/A;

the ratio between the value of said third resonant network capacitor and the value of said fourth resonant network capacitor is A/B;

the ratio between the value of said third resonant network inductor and the value of said fourth resonant network inductor is B/A.

8. The DC to AC inverter of claim 4 wherein said second supply voltage node is at ground.

9. The DC to AC inverter of claim 4 wherein said second supply voltage node is at a negative voltage relative to ground.

10. The DC to AC inverter of claim 4 wherein said first switching means comprises a first NPN transistor, and said second switching means comprises a second NPN transistor.

* * * * *